United States Patent
Saunders

(10) Patent No.: US 9,512,374 B2
(45) Date of Patent: Dec. 6, 2016

(54) PARTICULATE PUMP WITH ROTARY DRIVE AND INTEGRAL CHAIN

(71) Applicant: Timothy Saunders, Sacramento, CA (US)

(72) Inventor: Timothy Saunders, Sacramento, CA (US)

(73) Assignee: Gas Technology Institute, Des Plaines, IL (US)

(*) Notice: Subject to any disclaimer, the term of this patent is extended or adjusted under 35 U.S.C. 154(b) by 0 days.

(21) Appl. No.: 14/889,301

(22) PCT Filed: Jun. 25, 2014

(86) PCT No.: PCT/US2014/043987
§ 371 (c)(1),
(2) Date: Nov. 5, 2015

(87) PCT Pub. No.: WO2014/210092
PCT Pub. Date: Dec. 31, 2014

(65) Prior Publication Data
US 2016/0097009 A1    Apr. 7, 2016

Related U.S. Application Data

(60) Provisional application No. 61/840,392, filed on Jun. 27, 2013.

(51) Int. Cl.
*B65G 31/00* (2006.01)
*C10J 3/50* (2006.01)
*C10J 3/30* (2006.01)
*B65G 17/06* (2006.01)
*B65G 23/06* (2006.01)

(52) U.S. Cl.
CPC ............. *C10J 3/50* (2013.01); *B65G 17/065* (2013.01); *B65G 23/06* (2013.01); *C10J 3/30* (2013.01); *C10J 3/506* (2013.01); *C10J 2200/15* (2013.01); *C10J 2200/154* (2013.01); *C10J 2300/093* (2013.01)

(58) Field of Classification Search
CPC ...................................... B65G 31/04
USPC ................................... 198/638, 642
See application file for complete search history.

(56) References Cited

U.S. PATENT DOCUMENTS 4,154,560 A    5/1979  Streicher
4,597,491 A *  7/1986  Conklin ............... B65G 31/02
                                            198/638

(Continued)

FOREIGN PATENT DOCUMENTS

EP    0 930 254 A1    7/1999
EP    1 900 941 A2    3/2008

(Continued)

OTHER PUBLICATIONS

Concurrently filed, Co-pending U.S. Patent Application, Saunders, Timothy, "Solid Particulate Pump Having Flexible Seal,".

*Primary Examiner* — James R Bidwell
(74) *Attorney, Agent, or Firm* — Pauley Erickson & Kottis

(57) ABSTRACT

A particulate pump includes a posimetric rotary drive that has a hub affixed to a pair of discs. The posimetric rotary drive and chain together provides a working surface for a coal plug against a wall. A chain has a plurality of overlapping links and is integral with the hub.

24 Claims, 3 Drawing Sheets

(56) References Cited

U.S. PATENT DOCUMENTS

| | | | | |
|---|---|---|---|---|
| 5,257,691 | A * | 11/1993 | Spies | B65G 31/04 |
| | | | | 198/638 |
| 7,044,288 | B2 * | 5/2006 | Baer | B65G 31/04 |
| | | | | 198/642 |
| 8,006,827 | B2 * | 8/2011 | Aldred | B65D 88/66 |
| | | | | 198/638 |
| 8,851,406 | B2 * | 10/2014 | Sonwane | F23G 5/444 |
| | | | | 241/101.4 |
| 2011/0139257 | A1 | 6/2011 | Bielenberg et al. | |
| 2012/0006624 | A1 | 1/2012 | Russell | |
| 2012/0097506 | A1 | 4/2012 | Bebejian | |
| 2012/0321444 | A1 | 12/2012 | Sonwane et al. | |
| 2013/0081925 | A1 | 4/2013 | Stevenson et al. | |

FOREIGN PATENT DOCUMENTS

| | | |
|---|---|---|
| EP | 2 377 788 A2 | 10/2011 |
| GB | 818091 | 8/1959 |
| WO | WO 95/06610 | 3/1995 |

* cited by examiner

PARTICULATE PUMP WITH ROTARY DRIVE AND INTEGRAL CHAIN

BACKGROUND

Coal gasification involves the conversion of coal or other carbon-containing solid particulate into synthesis gas. While both dry coal and water slurry are used in the gasification process, dry coal pumping may be more thermally efficient than water slurry technology.

In order to streamline the process and increase the mechanical efficiency of dry coal gasification, a particulate pump is utilized to pump pulverized carbon-based fuel, such as dry coal particulate.

SUMMARY

A particulate pump according to an example of the present disclosure includes a posimetric rotary drive including a hub affixed to a pair of discs. The posimetric rotary drive provides a working surface for a coal plug against a wall. A chain has a plurality of overlapping links and is integral with the hub.

In a further embodiment of any of the foregoing embodiments, the hub supports the chain.

In a further embodiment of any of the foregoing embodiments, the discs are spaced apart and provide a passage there between, and the chain extends through the passage.

In a further embodiment of any of the foregoing embodiments, the hub includes a track guiding movement of the chain.

In a further embodiment of any of the foregoing embodiments, the hub is affixed with a linear load beam.

In a further embodiment of any of the foregoing embodiments, the linear load beam includes a track guiding movement of the chain.

A further embodiment of any of the foregoing embodiments includes a scraper adjacent a periphery of the discs.

In a further embodiment of any of the foregoing embodiments, the scraper includes an end that may be radially aligned with the periphery of the discs.

In a further embodiment of any of the foregoing embodiments, the chain is an endless chain.

In a further embodiment of any of the foregoing embodiments, the chain is segmented.

In a further embodiment of any of the foregoing embodiments, the posimetric rotary drive includes another hub spaced apart from the hub that is affixed to a pair of discs.

A method for use with a particulate pump according to an example of the present disclosure includes providing a coal plug in a posimetric rotary drive that includes a hub affixed to a pair of discs, wherein the posimetric rotary drive provides a working surface for the coal plug against a wall, moving a chain to move the coal plug through the posimetric rotary drive. The chain includes a plurality of overlapping links and is integral with the hub.

A further embodiment of any of the foregoing embodiments includes moving the coal plug across a scraper adjacent a periphery of the discs.

A further embodiment of any of the foregoing embodiments includes guiding the chain with tracks in the hub.

A further embodiment of any of the foregoing embodiments includes moving the chain using a drive sprocket.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
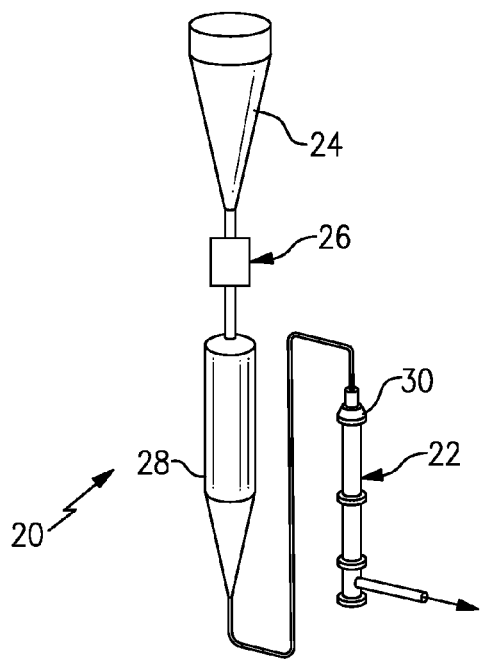
FIG. 1 is an example gasification system.

FIG. 1 schematically illustrates selected portions of a carbonaceous gasifier system 20 configured for gasification of coal, petcoke or the other carbon-based fuel to produce synthesis gas (also known as "syngas"). In this example, the gasifier system 20 generally includes an entrained-flow gasifier 22, or reactor vessel. The gasifier 22 is connected with a low pressure hopper 24, a particulate pump 26 and in some cases a high pressure tank 28 for providing carbonaceous particulate material to the gasifier 22. Although the particulate pump 26 is described in context of the gasifier system 22, the particulate pump 26 is also applicable in other systems to transport other types of particulate material in various industries, such as petrochemical, electrical power, food, and agricultural.

The gasifier 22 includes an injector 30 to receive and inject the carbonaceous particulate material and an oxidant into the interior volume of the gasifier 22. As an example, the injector 30 is an impingement-style, jet injector. The carbonaceous particulate material combusts within the gasifier 22 to produce the syngas, which may then be provided downstream to one or more filters for further processing, as is known.

Figure 2:
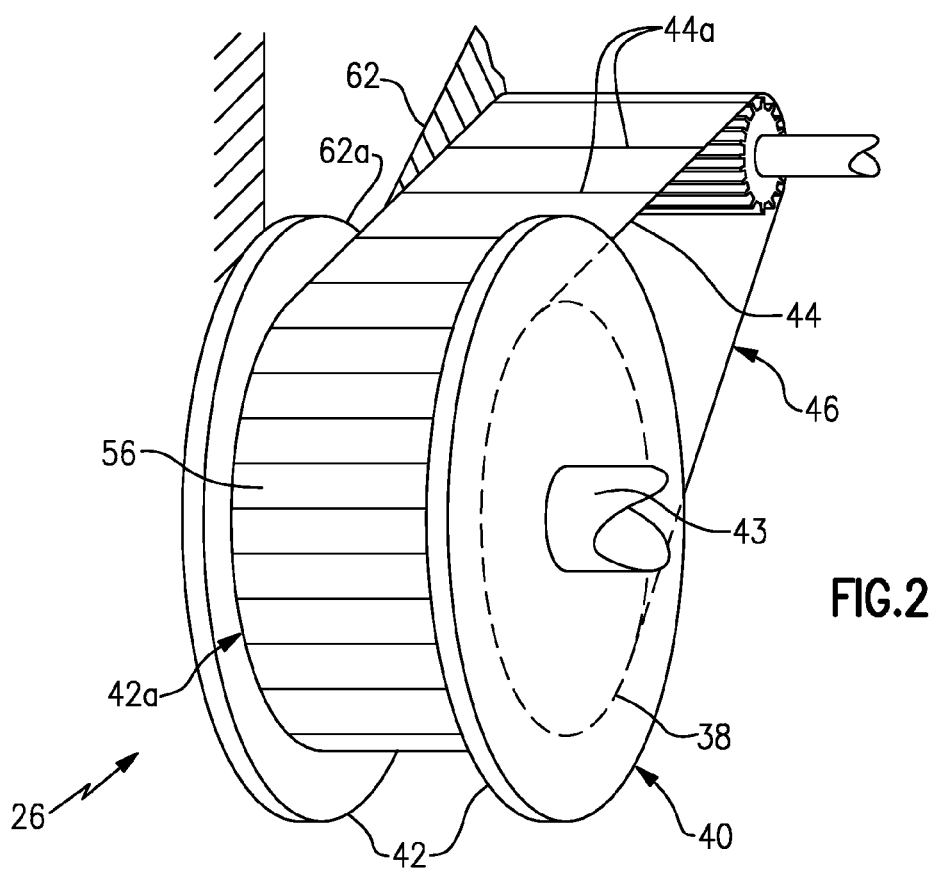
FIG. 2 illustrates selected portions of an example particulate pump.

FIG. 2 illustrates selected portions of an example of the pump 26. The pump 26 includes a posimetric rotary drive 40 that includes a pair of discs 42. A chain 44 includes a plurality of overlapping links 44a and is integral with the hub 38.

Figure 3:
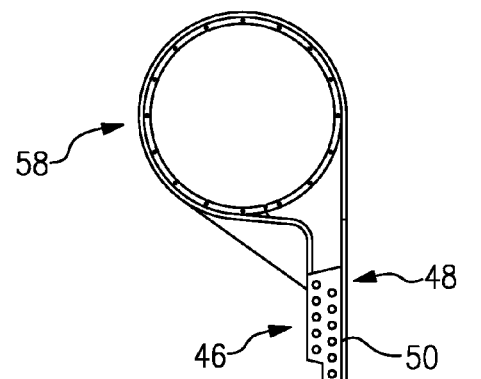
FIG. 3 illustrates a portion of a particulate pump that includes a load support structure, hub, and a pair of discs.
Figure 3:
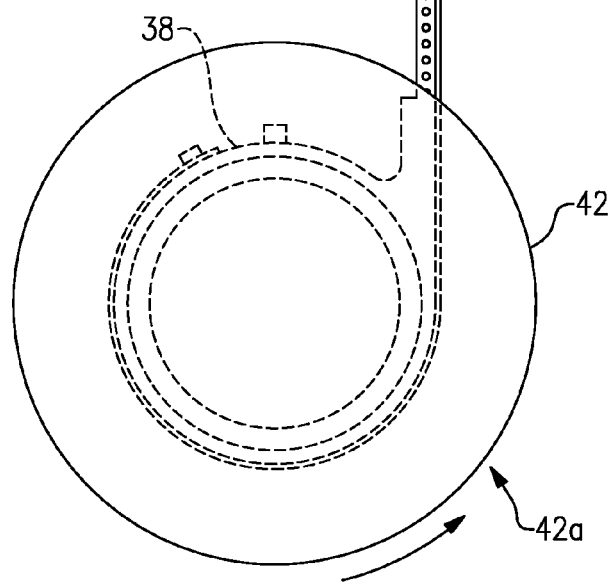
Figure 5:
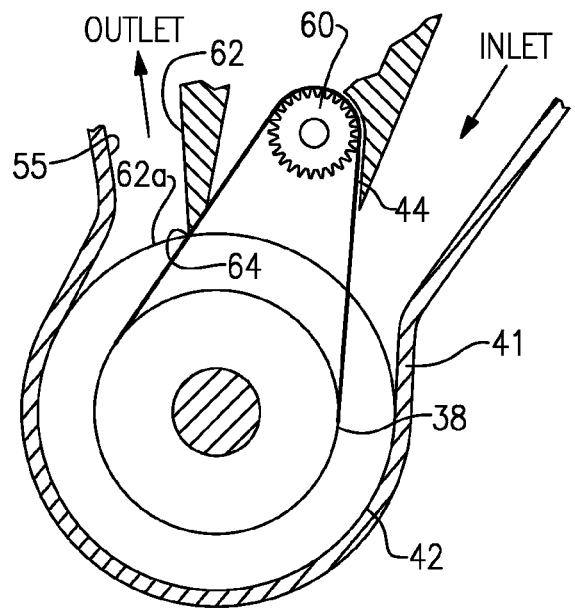
FIG. 5 illustrates a side view of the posimetric rotary drive.
Figure 4:
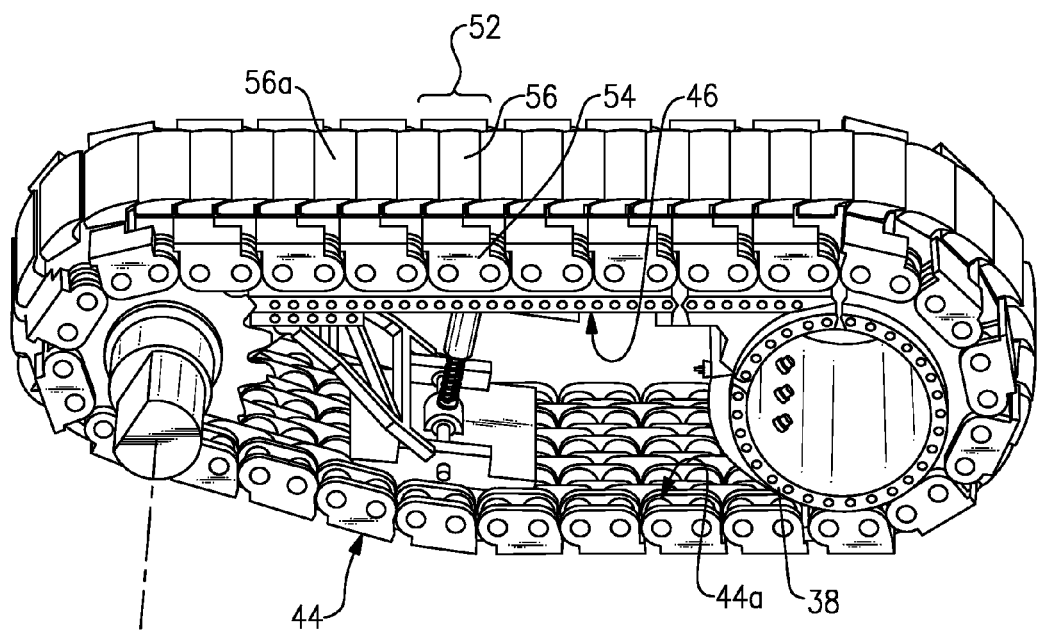
FIG. 4 illustrates the load support structure of FIG. 3 with an integral, segmented endless chain.
Figure 6:
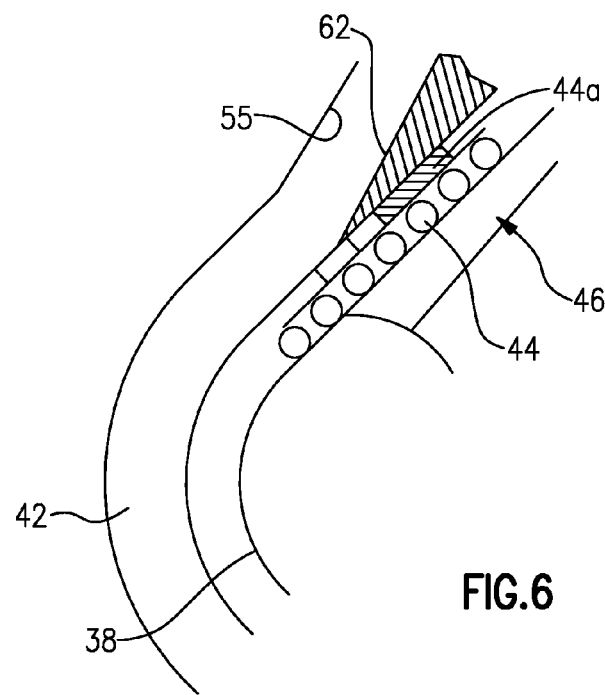
FIG. 6 illustrates another side view of a posimetric rotary drive.

Referring also to FIGS. 3, 4, and 5, the discs 42 are spaced apart and provide a passage 42a there between. The discs 42 can be supported by the hub 38 and a support shaft 43 (FIG. 2), which can be an idle shaft or can be used as a drive shaft. The rotary drive 40 can be enclosed in a housing or outer wall 41 around, or at least partially around, the rotary drive 40 to contain the coal plug at the outer diameter of the discs 42 as it moves through the passage 42a from an inlet to discharge at an outlet. The outer wall can be stationary or can be a moving wall to facilitate movement of the coal plug.

The chain 44 extends through the passage 42a and serves as the inner diameter of the passage 42a. The hub 38 is located within a support structure 46. In this example, the support structure 46 includes a linear load beam 48 with tracks 50 for guiding movement of the chain 44. In this example, the tracks 50 are raised rails that extend along the load support structure 46. The tracks 50 also extend around the hub 38 and thus also guide movement of the chain 44 around the hub 38 and support the chain 44.

The chain 44 is an endless, segmented chain. Each segment 52 of the chain 44 includes a link 54 that carries a tile 56. The tiles 56 overlap along the length of the chain 44 to seal particulate material from the interior of the chain 44 and load support structure 46. For example, the links 54 and tiles 56 may be those set forth in U.S. Pat. No. 8,307,974, incorporated herein by reference. The tiles 56 provide an upper working surface 56a for a coal plug against a wall to facilitate transport of the coal plug through the posimetric rotary drive 40.

The load support structure 46 can include another hub 58 located opposite the hub 38 with respect to the linear load beam 48. As shown in FIG. 5, a drive sprocket 60 can be operably connected with the hub 58 for moving the chain 44 around the load support structure 46 and through the passage 42a of the posimetric rotary drive 40. For example, the working surface 56a of the chain 44 facilitates moving the coal plug through the rotary drive 40 with respect to a duct 55. A scraper 62 can be provided adjacent a periphery 62a of the discs 42 to facilitate removal of coal particulate from the tiles 56. For example, the scraper 62 includes an end 64 that may be radially aligned with the periphery 62a of the discs 42.

The chain 44 enables a consolidated coal plug to be ejected between the discs 42 using the solid geometry of the tiles 56. Thus, the posimetric rotary drive 40 can provide relatively easy sealing by use of the discs 42, while the chain 44 and load support structure 46 provide strength, high pumping capacity, and good pumping efficiency relative to rotary drives that do not utilize the chain 44, for example. As can be appreciated, additional rotary drives 40 can be used in combination and additional chains 44 and load support structures 46 can be used adjacent to the chain 44 to provide a linear passage, similar to the linear passage set forth in U.S. Pat. No. 8,307,974. Additionally, the rotary drive 40 can include, or can be modified to include, additional discs, seals, and other features, such as features set forth in U.S. Pat. No. 8,006,827, incorporated herein by reference.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A particulate pump comprising:
    a posimetric rotary drive including a hub affixed to a pair of discs, wherein the posimetric rotary drive provides a working surface for a coal plug against a wall;
    a chain having a plurality of overlapping links, the chain integral with the hub; and
    wherein the hub is affixed with a linear load beam and where the linear load beam includes a track guiding movement of the chain.
2. The particulate pump as recited in claim 1, wherein the hub supports the chain.
3. The particulate pump as recited in claim 1, wherein the discs are spaced apart and provide a passage there between, and the chain extends through the passage.
4. The particulate pump as recited in claim 1, wherein the hub includes a track guiding movement of the chain.
5. The particulate pump as recited in claim 1, where the chain is an endless chain.
6. The particulate pump as recited in claim 1, where the chain is segmented.
7. The particulate pump as recited in claim 1, where the posimetric rotary drive includes another hub spaced apart from the hub that is affixed to a pair of discs.
8. A particulate pump including:
    a posimetric rotary drive including a hub affixed to a pair of discs, wherein the posimetric rotary drive provides a working surface for a coal plug against a wall;
    a chain having a plurality of overlapping links, the chain integral with the hub; and
    a scraper adjacent a periphery of the discs.
9. The particulate pump as recited in claim 8, wherein the hub is affixed with a linear load beam.
10. The particulate pump as recited in claim 9, where the linear load beam includes a track guiding movement of the chain.
11. The particulate pump as recited in claim 8, wherein the scraper includes an end that may be radially aligned with the periphery of the discs.
12. The particulate pump as recited in claim 8, wherein the hub supports the chain.
13. The particulate pump as recited in claim 8, wherein the discs are spaced apart and provide a passage there between, and the chain extends through the passage.
14. The particulate pump as recited in claim 8, wherein the hub includes a track guiding movement of the chain.
15. The particulate pump as recited in claim 8, where the chain is an endless, segmented chain.
16. The particulate pump as recited in claim 8, wherein the posimetric rotary drive includes another hub spaced apart from the hub that is affixed to a pair of discs.
17. A method for use with a particulate pump, the method comprising:
    providing a coal plug in a posimetric rotary drive that includes a hub affixed to a pair of discs, wherein the posimetric rotary drive provides a working surface for the coal plug against a wall;
    moving a chain to move the coal plug through the posimetric rotary drive, the chain includes a plurality of overlapping links and is integral with the hub; and
    moving the coal plug across a scraper adjacent a periphery of the discs.
18. The method as recited in claim 17, including guiding the chain with tracks in the hub.
19. The method as recited in claim 17, including moving the chain using a drive sprocket.
20. A particulate pump comprising:
    a posimetric rotary drive including a hub affixed to a pair of discs, wherein the posimetric rotary drive provides a working surface for a coal plug against a wall;
    a chain having a plurality of overlapping links, the chain integral with the hub; and
    wherein the posimetric rotary drive includes another hub spaced apart from the hub that is affixed to a pair of discs.
21. The particulate pump as recited in claim 20, wherein the hub supports the chain.
22. The particulate pump as recited in claim 20, wherein the discs are spaced apart and provide a passage there between, and the chain extends through the passage.
23. The particulate pump as recited in claim 20, wherein the hub includes a track guiding movement of the chain.

24. The particulate pump as recited in claim 20, where the chain is an endless, segmented chain.

\* \* \* \* \*